(12) United States Patent
Kobayashi

(10) Patent No.: US 6,631,114 B1
(45) Date of Patent: Oct. 7, 2003

(54) OPTICAL DISC, TRACKING CONTROLLING APPARATUS AND METHOD, AND FOCUS CONTROLLING APPARATUS AND METHOD

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/277,440

(22) Filed: Mar. 26, 1999

(30) Foreign Application Priority Data

Apr. 7, 1998 (JP) .......................................... P10-095014

(51) Int. Cl.[7] ................................................. G11B 7/00
(52) U.S. Cl. .................. 369/275.4; 369/47.1; 369/53.1; 369/59.1; 369/44.13
(58) Field of Search ............................... 369/47.1, 53.1, 369/59.1, 44.13, 275.1, 275.2, 275.3, 275.4

(56) References Cited

U.S. PATENT DOCUMENTS

| 5,422,874 A | 6/1995 | Birukawa et al. |
| 6,292,446 B1 * | 9/2001 | Watabe ....................... 369/53.2 |

FOREIGN PATENT DOCUMENTS

| EP | 0 603 968 | 6/1994 |
| EP | 0 740 291 | 10/1996 |
| EP | 0 821 350 | 1/1998 |
| GB | 2 307 589 | 5/1997 |

* cited by examiner

Primary Examiner—Muhammad Edun
(74) Attorney, Agent, or Firm—Oblon, Spivak, McClelland, Maier & Neustadt, P.C.

(57) ABSTRACT

An optical disc 1 has spiral grooves GR formed on a data recording surface thereof and in which information is written to, and read from, both a land between the grooves and the grooves as tracks. Each track has a plurality of address areas AR1 and user areas AR2 formed thereon, and each of the address areas AR1 has embossed pits for a groove header GRH and embossed pits for a land header LH. Each of the address areas AR1 has provided in a leading part thereof a header mark area HM formed from a mirror finished surface. That is, this optical disc is of an on-land/in-groove recording type. An offset taking place in a tracking error signal and focus error signal is removed to accurately control the tracking and focus of an optical head.

21 Claims, 17 Drawing Sheets

OPTICAL DISC, TRACKING CONTROLLING APPARATUS AND METHOD, AND FOCUS CONTROLLING APPARATUS AND METHOD

BACKGROUND OF THE INVENTION

1. Field of the Invention

The present invention relates to an optical disc having spiral grooves formed on a data recording surface thereof and in which information is written to, and read from, both a land between the grooves and the grooves as tracks, a tracking controlling apparatus and method for the optical disc, and a focus controlling apparatus for the optical disc.

2. Description of Related Art

Various optical recording media, disc- and card-shaped, adopting an optically or magneto-optically signal recording/reproducing method, have been developed and are commercially available. These optical recording media include a read-only memory (ROM) type recording medium such as so-called compact disc (CD), well known as CD-ROM, a write-once type recording medium to which the user can write data once, a rewritable (spo-called overwrite) type recording medium such as magneto-optical disc (MO), etc.

The optical disc drive to write and read data to and from a disc-shaped recording medium uses an optical head incorporating a laser diode to emit a light beam for writing and reading information to and from the optical disc, a photodetector to detect a reflected light of the light beam focused on the optical disc, etc. and is adapted for servo control of the focus and tracking of the optical head based on a reflected light detection output provided from the photodetector. In the optical disc drive, the optical head writes and reads data to and from the optical disc by scanning the light beam on a recording track on the optical disc while driving to spin the optical disc at a constant angular velocity or constant linear velocity by a spindle motor running at a servo-controlled speed. For example, the tracking is servo-controlled by the one-beam pushpull method or three-beam method, for example. However, taking in consideration the recent highly increased storage capacity and recording density of optical discs, highly improved control of the laser diode output power and optical system, and related improvements in the art, the pushpull method should desirably be used for servo control of the optical head tracking.

In the optical disc drive adopting the pushpull method, a light beam reflected and diffracted by grooves on the optical disc is detected by two photodetectors disposed symmetrically with respect to the track center, and a difference between outputs from the photodetectors is detected as a pushpull signal. The pushpull signal is used as a tracking error for servo control of the biaxial actuator, etc. for tracking of the optical head.

Recently, ROM (read-only memory) and RAM (random access memory) discs proposed as optical recording media show a considerably large storage capacity. Semiconductor lasers of shorter wavelengths have been proposed for use in the optical heads of optical disc drives, and objective lenses of a larger numerical aperture (NA) have been proposed for use to focus a light beam onto the information recording surface of an optical disc.

To implement a phase-change type optical disc having a larger storage capacity and higher density than DVD-RAM, it is known to use a smaller focused light spot size. The size of a focuses spot on the recording medium is given generally as $\lambda/NA$. The focused spot size can be reduced by using a short-wave semiconductor laser such as GaN, ZnSe or the like or by using a two-group lens or the like, typically, a solid immersion lens (SIL) to increase the objective lens NA.

Assume here that $\lambda=640$ nm and NA=0.85, for example. The diameter of a laser spot focused on the recording medium will be about 0.75 $\mu$m. In this case, when signal is written using RLL (1, 7) for example, a recording density of about 0.21 $\mu$m/bit can be attained.

Well-known modulation codes in a modulation system using a wide channel detection window suitable for a high-density recording and reproduction include RLL (1, 7) and RLL (2, 7).

Further, in an optical disc system adopting an optical head in which an objective lens of a large NA is used, to accommodate an error caused by the influence on the light beam of dust or scratch on the surface of the optical, the error correction capability should be improved by increasing the code and ECC block.

Assume here that the optical disc spins without run-out. As shown in FIG. 1(A) for example, a photodetector 70 is irradiated at the center thereof with a reflected light of the laser beam. However, if the optical disc spins with a run-out, the photodetector 70 will be irradiated at a position off the center thereof with the reflected light of the laser beam as shown in FIGS. 1(B) to 1(D). Thus, a DC offset will take place in a pushpull signal produced from the reflected light of the laser beam from the groove. FIG. 2(A) shows a pushpull signal offset, indicated with a solid line, from an ideal pushpull signal indicated with a dashed line.

In an optical disc in which data is written on lands as well as in grooves, the reflected light of the laser beam from the lands and grooves results in a pushpull signal suffering from an offset. As in FIG. 2(A), a pushpull signal produced from a reflected light of the laser beam from the land is offset from an ideal pushpull signal as shown in FIG. 2(B).

If a pushpull signal offset takes place, no accurate tracking is possible. Especially in a large storage capacity, high recording density optical disc, since the space between land and groove is decreased correspondingly to the increase of the storage capacity and recording density, tracking of the optical head has to be done more accurately.

In some of so-called on-land/in-groove recording type optical discs in which both the land track and groove track have a generally same width and the groove depth is ⅙ to ⅕ of the wavelength of a write/read laser light, embossed pits are used as addresses.

In writing or reading information to or read from an on-land track, for example, however, since the polarity of a tracking error signal in an address area is reversed, a tracking tried with the laser spot in an address area after seeking cannot be performed. The actuator makes a big jump, the laser spot is far from a target address, and thus the access time is longer.

Even with the laser spot focused on a track, a tracking error will be a disturbance when the optical head is in an address area, and also a focus error will be a disturbance when the optical head is in the address area.

Furthermore, in an on-land/in-groove recording, a focus error offset on a land track is detected to be different from one on a groove track in some cases.

Also, in an optical head using a one-beam optical system, a tracking error offset caused by a light intensity off the center of on the photodetector when the optical disc runs out, is a problem.

SUMMARY OF THE INVENTION

It is therefore an object of the present invention to overcome the above-mentioned drawbacks of the prior art by providing an optical disc, a tracking controlling apparatus and method, and a focus controlling apparatus and method, in which an offset arisen in a tracking error signal and focus error signal is removed to accurately control the tracking and focus of the optical head.

The above object can be achieved by providing an optical disc having spiral grooves formed on a data recording surface thereof and in which information is written to, and read from, both a land between the grooves and the grooves as tracks, each track having formed thereon a plurality of address areas and user areas;

each of the address areas having formed thereon embossed pits for a groove header and embossed pits for a land header; and each of the address areas having provided in a leading part thereof a header mark area formed from a mirror finished surface.

The above object can be achieved also by providing an optical disc having spiral grooves formed on a data recording surface thereof and in which information is written to, and read from, both a land between the grooves and the grooves as tracks, each track having formed thereon a plurality of address areas and user areas;

each of the address areas having formed thereon embossed pits for a groove header and embossed pits for a land header; and each of the address areas having provided in a leading part thereof a header mark area formed from a mirror finished surface and grooves.

According to the present invention, the optical disc may have, for instance, groove tracks and land tracks formed to wobble at a single frequency.

According to the present invention, the optical disc may be formed, for instance, to have a plurality of zones formed by dividing the data recording surface of the optical disc concentrically and a plurality of sectors formed by dividing each zone on the data recording surface into radial areas.

The above object can be achieved also by providing a tracking controlling apparatus, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface, the apparatus comprising, according to the present invention;

means for generating a tracking error signal from a detection output provided from an optical head which irradiates a laser beam to, and detects a reflected light of the irradiated laser beam from, a data recording surface of the optical disc;

means for detecting a header mark area of the address area based on the detection output provided from the optical head;

means for sampling and holding, based on the detection output provided from the header mark area detecting means, a tracking error signal generated by the tracking error generating means from the detection output provided from the optical head staying in the header mark area of the address area;

means for detecting a difference between the tracking error signal generated by the tracking error generating means and the tracking error signal sampled and held by the sampling and holding means; and means for controlling the tracking of the optical head using as a tracking error signal the difference detection output provided from the tracking error difference detecting means.

The above object can be achieved also by providing a tracking controlling apparatus, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a Mirror finished surface and grooves, the apparatus comprising, according to the present invention;

means for generating a tracking error signal from a detection output provided from an optical head which irradiates a laser beam to, and detects a reflected light of the irradiated laser beam from, a data recording surface of the optical disc;

means for detecting a header mark area of the address area based on the detection output provided from the optical head;

means for sampling and holding, based on the detection output provided from the header mark area detecting means, a tracking error signal generated by the tracking error generating means from the detection output provided from the optical head staying in the header mark area of the address area;

means for detecting a difference between the tracking error signal generated by the tracking error generating means and the tracking error signal sampled and held by the sampling and holding means; and means for controlling the tracking of the optical head using as a tracking error signal the difference detection output provided from the tracking error difference detecting means.

According to the present invention, the tracking controlling apparatus may further comprise, for example, a tracking servo pull-in controlling means which disables a tracking servo pull-in with the optical head standing in the address area and enables only a tracking servo pull-in with the optical head standing in the user area, based on the detection output provided from the header mark area detecting means.

According to the present invention, the tracking controlling apparatus may be adapted, for instance, such that based on the detection output provided from the header mark area detecting means, the tracking controlling means controls the tracking of the optical head using as a tracking error signal a sampled and held output provided from the sampling and holding means which holds the difference detection output provided from the difference detecting means for a period during which the optical head stays in the address area.

According to the present invention, the tracking controlling apparatus may further comprise, for example, a lowpass filter means which is supplied with the difference detection output provided from the difference detecting means;

the tracking controlling means controlling the tracking of the optical head using as a tracking error signal an output provided from the lowpass filter means.

The above object can be achieved also by providing a tracking controlling method, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface, the method comprising, according to the present invention, the steps of:

generating a tracking error signal from a reflected light detection output provided from an optical head which irradiates a laser beam to, and detects a reflected light of the irradiated laser beam from, a data recording surface of the optical disc;

detecting a header mark area of the address area based on the reflected light detection output provided from the optical head;

sampling and holding, based on the detection output provided from the header mark detecting means, a tracking error signal generated from the reflected light detection output from the optical head staying in the header mark area of the address area;

detecting a difference between the tracking error signal and the sampled and held tracking error signal; and controlling the tracking of the optical head using the difference detection output as a tracking error signal.

The above object can be achieved also by providing a tracking controlling method, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface and grooves, the method comprising, according to the present invention, the steps of:

generating a tracking error signal from a reflected light detection output provided from an optical head which irradiates a laser beam to, and detects a reflected light of the irradiated laser beam from, a data recording surface of the optical disc;

detecting a header mark area of the address area based on the reflected light detection output provided from the optical head;

sampling and holding, based on the header mark area detection output, a tracking error signal generated from the reflected light detection output provided from the optical head staying in the header mark area of the address area;

detecting a difference between the tracking error signal and the sampled and held tracking error signal; and controlling the tracking of the optical head using the difference detection output as a tracking error signal.

According to the present invention, the tracking controlling method may be, adapted, for instance, such that based on the header mark area detection output, a tracking servo pull-in with the optical head standing in an address area is disabled and only a tracking servo pull-in with the optical head standing in the user area is enabled.

According to the present invention, the tracking controlling method may be, for example, such that based on the header mark area detection output, a tracking of the optical head is controlled with a tracking error signal of which the difference detection output has been held for a period during which the optical head stays in the address area.

The above object can be achieved also by providing a focus controlling apparatus, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface, the apparatus comprising, according to the present invention:

means for generating a focus error signal from a detection output provided from an optical head which irradiates a laser beam to, and detects a reflected light of the irradiated laser beam from, a data recording surface of the optical disc;

means for detecting a header mark area of the address area based on the detection output provided from the optical head;

means for sampling and holding, based on the detection output provided from the header mark area detecting means, a focus error signal generated by the focus error generating means from the detection output provided from the optical head staying in the header mark area of the address area;

a first means for detecting a difference between the focus error signal generated by the focus error generating means and the focus error signal sampled and held by the sampling and holding means;

a second means for detecting a difference between the focus error signal generated by the focus error signal generating means and the difference detection output provided from the first difference detecting means; and means for controlling the focus of the optical head using as a focus error signal the difference detection output provided from the second difference detecting means.

The above object can be achieved also by providing a focus controlling apparatus, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface and grooves, the apparatus comprising, according to the present invention:

means for generating a focus error signal from the detection output provided from an optical head which irradiates a laser beam to, and detects a reflected light of the irradiated laser beam from, a data recording surface of the optical disc;

means for detecting a header mark area of the address area based on the detection output provided from the optical head;

means for sampling and holding, based on the detection output provided from the header mark area detecting means, a focus error signal generated by the focus error generating means from the detection output provided from the optical head staying in the header mark area of the address area;

a first means for detecting a difference between the focus error signal generated by the focus error generating means and the focus error signal sampled and held by the sampling and holding means;

a second means for detecting a difference between the focus error signal generated by the focus error signal generating means and the difference detection output provided from the first difference detecting means; and means for controlling the focus of the optical head using as a focus error signal the difference detection output provided from the second difference detecting means.

According to the present invention, the focus controlling apparatus may be adapted, for instance, such that the focus controlling means controls the focus of the optical head using as a focus error signal the sampled and held output provided from the sampling and holding means which holds the difference detection output provided from the second difference detecting means for a period during which the optical head stays in the address area, based on the detection output provided from the header mark area detecting means,.

According to the present invention, the focus controlling apparatus may further comprise, for example, a lowpass filter means which is supplied with the difference detection output provided from the second difference detecting means;

the focus controlling means controlling the focus of the optical head using as a focus error signal an output provided from the lowpass filter means.

The above object can be achieved also by providing a focus controlling method, for use with optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface, the method comprising, according to the present invention, the steps of:

generating a focus error signal from a reflected light detection output provided from an optical head which irradiates a laser beam to, and detects a reflected light of the irradiated laser beam from, a data recording surface of the optical disc;

detecting a header mark area of the address area based on the reflected light detection output;

sampling and holding, based on the header mark area detection output, a focus error signal generated from the reflected light detection output from the optical head staying in the header mark area of the address area;

firstly detecting a difference between the focus error signal generated from the reflected light detection output and the sampled and held focus error signal;

secondly detecting a difference between the focus error signal generated from the reflected light detection output and the difference detection output resulted from the first difference detection; and controlling the focus of the optical head using as a focus error signal the difference detection output resulted from the second difference detection.

The above object can be achieved also by providing a focus controlling method, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface and grooves, the method comprising, according to the present invention:

generating a focus error signal from a reflected light detection output provided from an optical head which irradiates a laser beam to, and detects a reflected light of the irradiated laser beam from, a data recording surface of the optical disc;

detecting a header mark area of the address area based on the reflected light detection output;

sampling and holding, based on the header mark area detection output, a focus error signal generated from the detection output provided from the optical head staying in the header mark area of the address area;

firstly detecting a difference between-the focus error signal generated from the reflected light detection output and the sampled and held focus error signal;

secondly detecting a difference between the focus error signal generated from the reflected light detection output and the difference detection output resulted from the first difference detection; and controlling the focus of the optical head using as a focus error signal the difference detection output resulted from the second difference detection.

According to the present invention, the focus controlling method may be adapted, for example, such that based on the header mark area detection output, the focus of the optical head is controlled using a focus error signal of which the difference detection output resulted from the second difference detection has been held for a period during which the optical head stays in the address area.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1A:
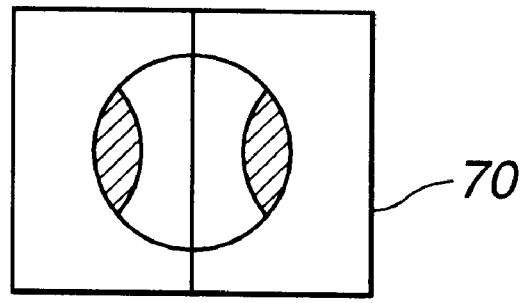
FIGS. 1A, 1B, 1C, 1D show the reflected light of laser beam irradiated to the photodetector in a conventional optical head.
Figure 1B:
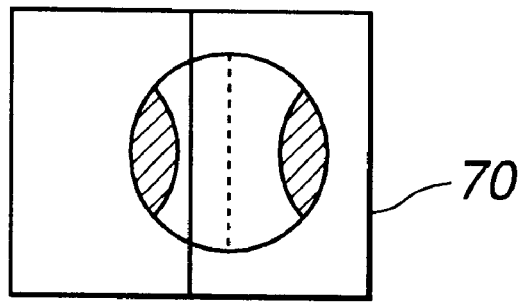
Figure 1C:
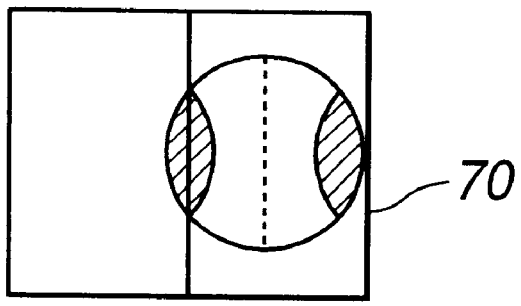
Figure 1D:
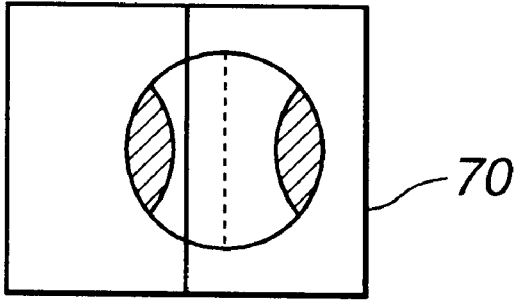
Figure 2A:
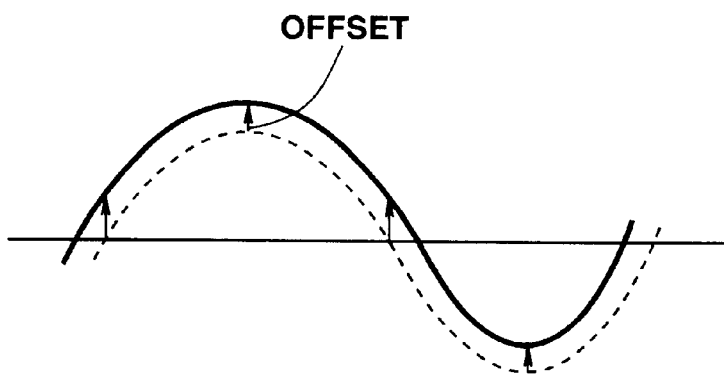
FIGS. 2A and 2B show offset from an ideal pushpull signal.
Figure 2B:
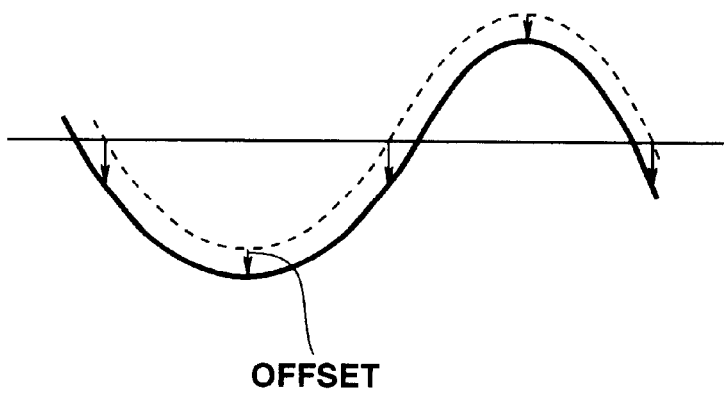
Figure 3:
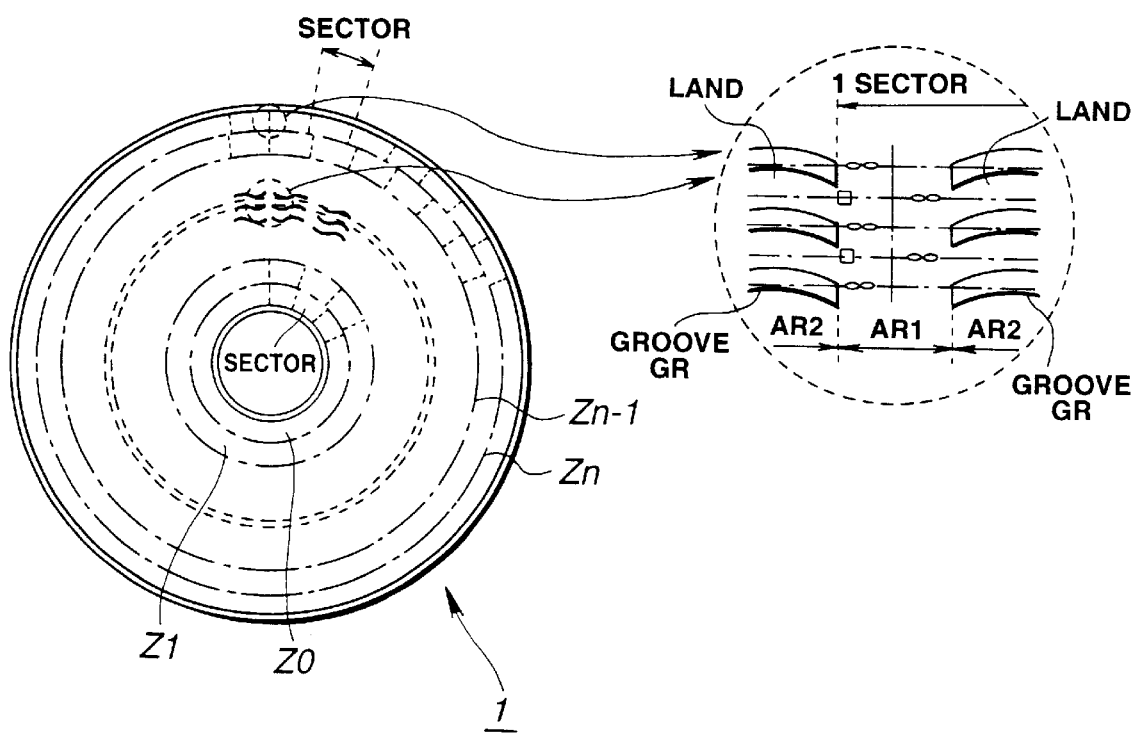
FIG. 3 shows a configuration of an optical disc according to the present invention.

Referring now to FIG. 3, there is illustrated an optical disc of the present invention. The optical disc is generally indicated with a reference 1.

The optical disc 1 has formed thereon sectors by radially dividing a data recording surface of the optical disc 1 and a plurality of zones Z0 to Zn by concentrically dividing the data recording surface.

Each of the sectors is assigned to an address area AR1 in which an address is written in a leading part thereof, and the subsequent sectors are assigned to user areas AR2 in which data are written. In the user area AR2, grooves GR are formed wobbling. Also in the innermost zone Z0, grooves GR are formed to wobble for a predetermined number of periods, and in the zones going towards the outer circumference of the optical disc, grooves GR are formed to wobble for an increased number of wobbling periods. The address areas AR1 are discretely disposed on the optical disc and have address information recorded for each sector therein. The address area AR1 has assigned thereto a length corresponding to the predetermined number of wobbling periods of the groove GR.

Figure 4:
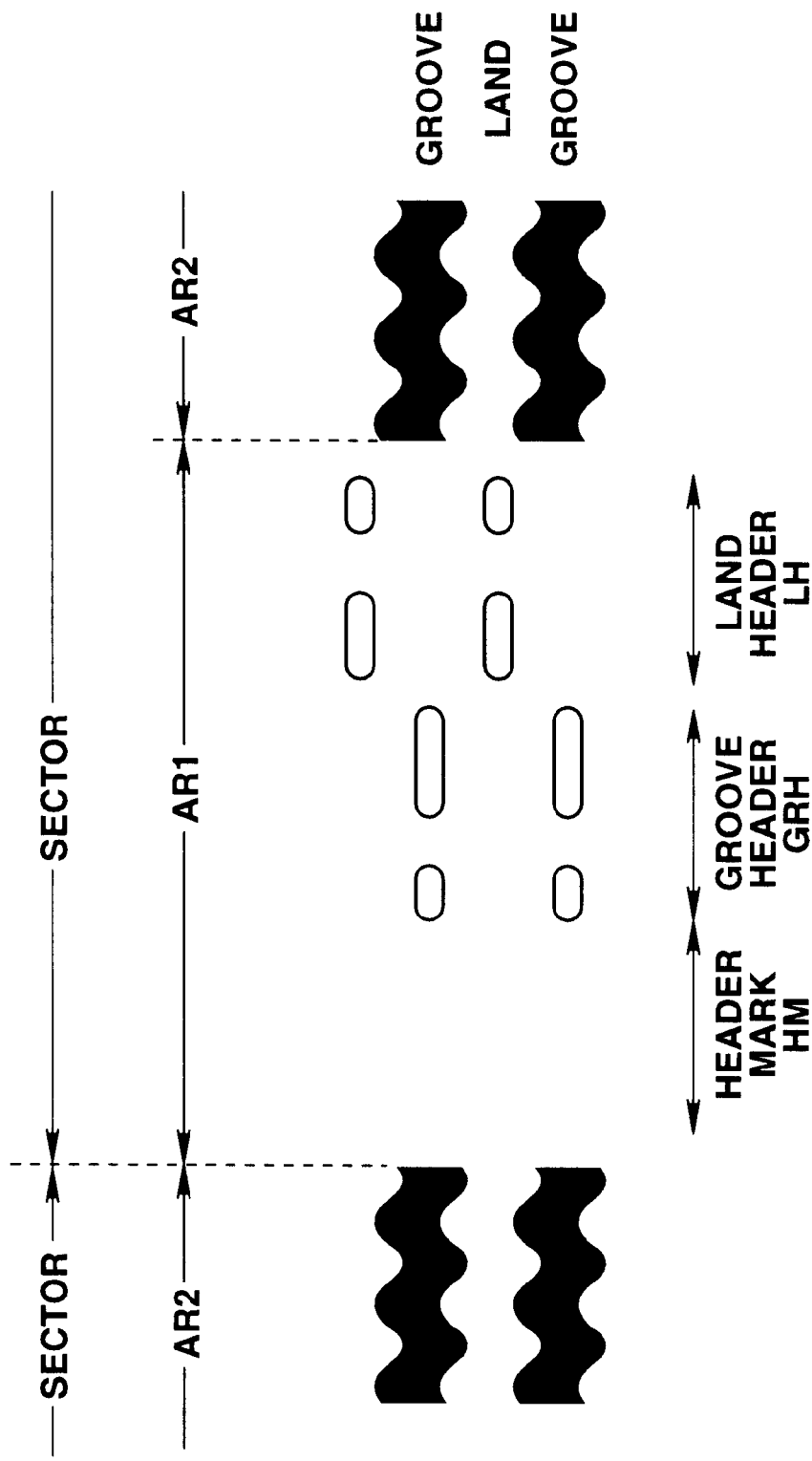
FIG. 4 shows a configuration of the optical disc in FIGS. 1A, 1B, 1C, and 1D, showing am address area and user areas.

As shown in FIG. 4, in a former half of the address area AR1, a row of embossed address pits for a groove header GRH is formed on a track center line through the groove GR. In latter half of the address area AR1, a row of embossed address pits for a land header LH is formed on a track center line through a land.

Figure 5:
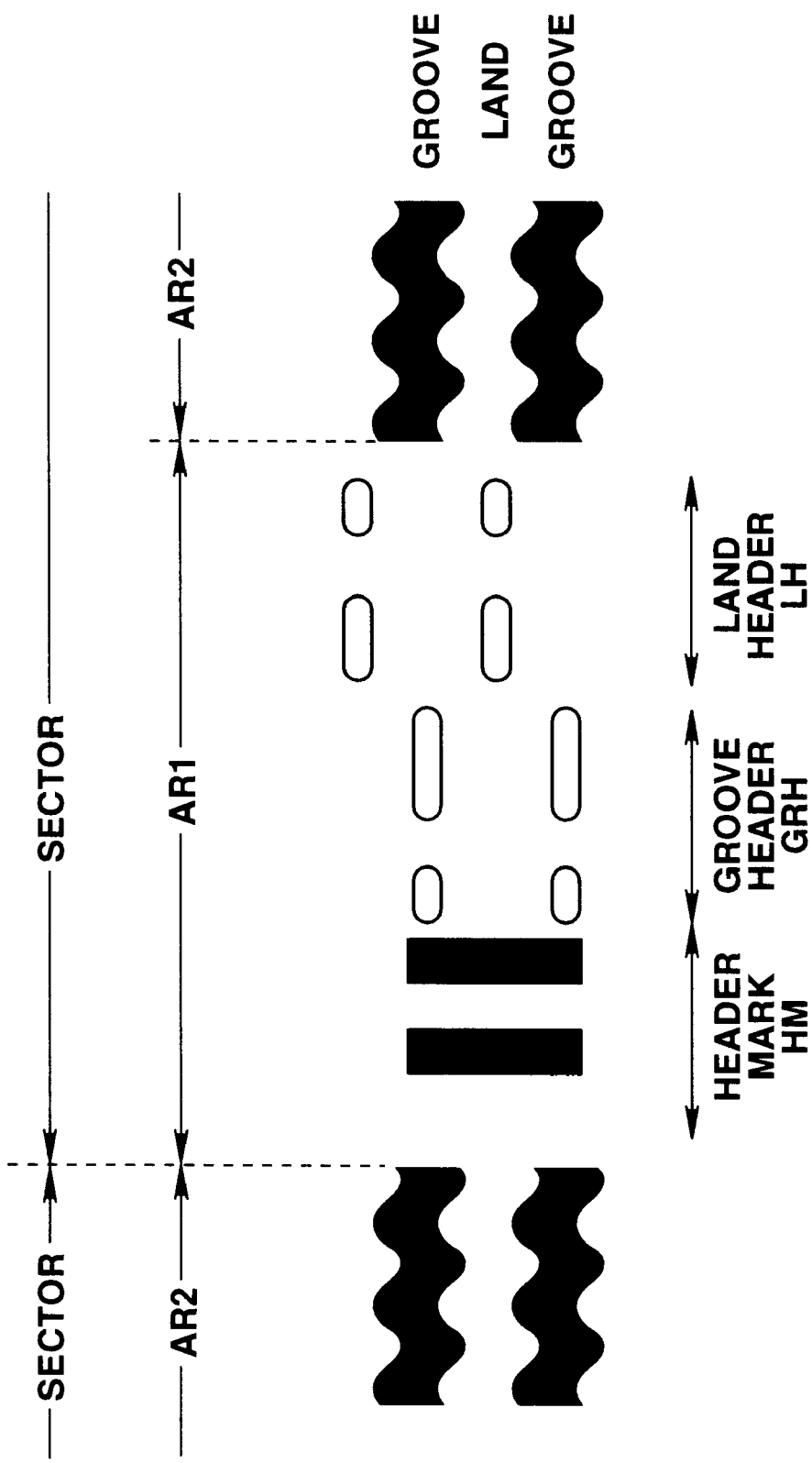
FIG. 5 shows another configuration of the optical disc in FIGS. 1A, 1B, 1C, and 1D, showing am address area and user areas.

Note that the embossed address pits formed in the address area AR1 may be disposed in positions adjoining the groove track and land track, respectively, as shown in FIG. 5.

In the leading area of the address area AR1, a header mark HM is formed from a mirror finished surface, not by grooving and embossing. The header mark HM formed from the mirror finished surface is higher in reflectivity than the user areas AR2 having land and groove tracks and each address pit area including the land header LH and groove header GRH in the address area AR1, and thus it can easily be detected.

Figure 6:
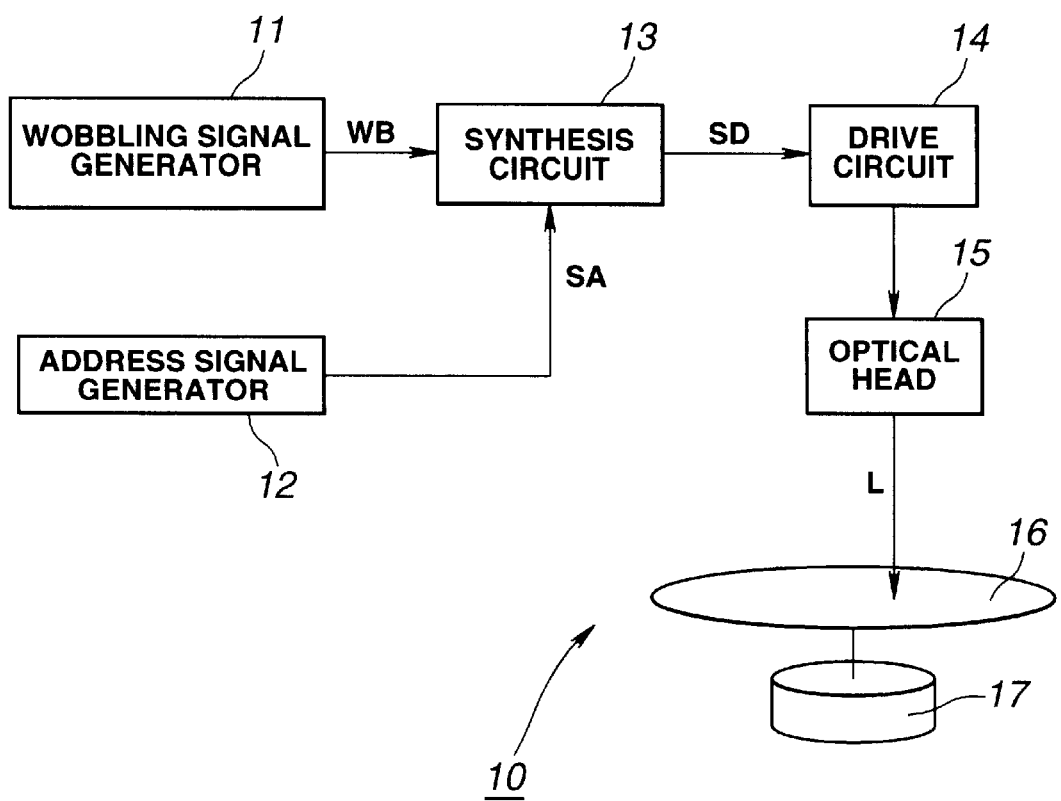
FIG. 6 is a schematic block diagram.of a mastering apparatus for manufacture of the optical disc in FIGS. 1A, 1B, 1C, and 1D.

The optical disc 1 is manufactured using a disc master prepared by a mastering apparatus 10 configured as shown in FIG. 6, for example.

The mastering apparatus 10 comprises a wobbling signal generation circuit 11, an address signal generation circuit 12, and a synthesis circuit 13 supplied with signals from the wobbling signal generation circuit 11 and address signal generation circuit 12, respectively, to provide a drive signal SD by synthesis, a drive circuit 14 to drive an optical head 15 based on the drive signal supplied from the synthesis circuit 13, a spindle motor 17 to drive to spin a disc master 16, and a system control circuit (not shown).

The wobbling signal generation circuit 11 provides as a wobbling signal WB a sinewave signal of a predetermined frequency synchronous with the spinning of the disc master 16. Also, this circuit 11 stepwise increases the frequency of the wobbling signal WB correspondingly to a zoning and provides it as an output. The circuit 11 shifts the laser beam focus position to wobble the groove GR for a predetermined period per sector according to the wobbling signal WB.

The address signal generation circuit 12 is controlled by the system control circuit (not illustrated) to generate an address signal SA of which the value is sequentially changed according to the displacement of the optical head 15.

More specifically, the address signal generation circuit 12 is supplied with timing signals including an FG signal synchronous with the spinning of the disc master 16, etc. from the spindle motor 17, etc. and counts the timing signals by a predetermined counter to generate an address data ID indicative of the laser beam focus position. At this time, the address signal generation circuit 12 adds to the address data ID a sector mark SM, sync timing data VFO, header mark AM and a postamble PA to generate a groove header and land header for assignment to the former and latter halves of the address area AR1. Note that a same clock pattern as a one written to, and read from, a leading part of the user area AR2 is generated as the sync timing data VFO. The address signal generation circuit 12 converts a sector header thus generated to a string of serial data, and modulates the serial data string into a predetermined format.

Further, the address signal generation circuit 12 supplies the synthesis circuit 13 with the modulation output as an address signal SA. The address signal generation circuit 12 provides the address signal SA at a time corresponding to the scanning with a laser beam L from the optical head 15.

The drive circuit 14 zones the disc master 16 by changing the driving conditions for the optical head 15 at a time synchronous with the spinning of the disc master 16 correspondingly to the laser beam focus position. More particularly, the drive circuit 14 changes the driving conditions for the optical head 15 in such a manner as to radially divide the data recording surface of the disc master 16 to form sectors. Further, the time of changing the driving conditions is shifted stepwise from the inner circumference of the disc master 16 towards the outer circumference to stepwise divide the data recording surface concentrically, to thereby form a plurality of zones Z0 to Zn.

Also, the drive circuit 14 is controlled by the system control circuit (not shown) to shift the laser beam focus position in the user area AR2 under the drive signal SD, thereby forming a wobbling groove GR in the user area AR2.

In the former half of the address area AR1, the laser beam focus position shifting is ceased and the amount of laser beam is intermittently increased under the drive signal SD, to thereby form a row of pits on a track center line through the groove GR. In the latter half of the address area AR1, the laser beam focus position is shifted onto a track center line through the inner land and the amount of laser beam is intermittently increased under the drive signal SD, to thereby form a row of pits on the track center line through the land.

At this time, the drive circuit 14 allows to record, in the former half of the address area AR1, the address data recorded in the sector by the groove GR following the sector in the form of the pit row on the track center line, and in the latter half of the address area AR1, the address data recorded in the sector by an inner land following the sector in the form of the pit row on the track center line.

The optical head 15 is constructed to be moved radially of the disc master 16 by the optical system. Further, the optical head 15 has the focused spot diameter of the laser beam L set in manufacture of an optical disc using the disc master 16 so that the grooves GR formed by exposure to the laser beam L have a same width as the land formed between the grooves GR. In this embodiment, the spot shape and light amount of the laser beam L are set for the effective exposure range to the laser beam L to be larger than a final intended width of the groove GR. Therefore, the optical head 15 allows to expose the disc master 16 so that an optical disc produced using the disc master 16 can have data recorded on the land and in the grooves GR.

The disc master 16 is formed from a glass substrate having a photoresist coating applied to a surface thereof, for example. The disc master 16 is driven by the spindle motor 17 to spin at a constant angular velocity. The optical head 15 irradiates a laser beam L onto the disc master 16 while being moved by a predetermined sled mechanism little by little radially from the inner circumference towards the outer circumference of the disc master 16 synchronously with the spinning of the disc master 16. Thus the optical head 15 allows to form spiral tracks one after another from the inner circumference towards outer circumference of the disc master 16.

Through the aforementioned procedure, the mastering apparatus 10 produces the above-mentioned optical disc 1 which is a high NA one having a thickness of 0.1 mm and a numerical aperture (NA) as high as 0.85, for example, by irradiation of a laser beam L to the disc master 16.

Next, an optical disc recording/reproducing apparatus (will be referred to as "optical disc drive" hereinunder) 20 destined to write and read data to and from the optical disc 1, will be described herebelow with reference to FIG. 7.

The optical disc drive 20 comprises an optical head 21 to write and read data by means of a laser beam, a write/read circuit 22 to convert the data to a predetermined format, a sled motor 23 to move the optical head 21 radially of the optical disc 1, a servo circuit 24 to control tracking and focus of he optical head 21, an address detection circuit 25 to detect an address of the data being read out from the optical disc 1, and a spindle motor 26 to drive to spin the optical disc 1.

The optical head 21 writes a data supplied via a system control circuit 32 which will further be described later and the write/read circuit 22 to the optical disc 1 by means of a laser beam. The write/read circuit 22 converts a data supplied from the system control circuit 32 to a predetermined format, and provides it to the optical head 21.

Figure 8:
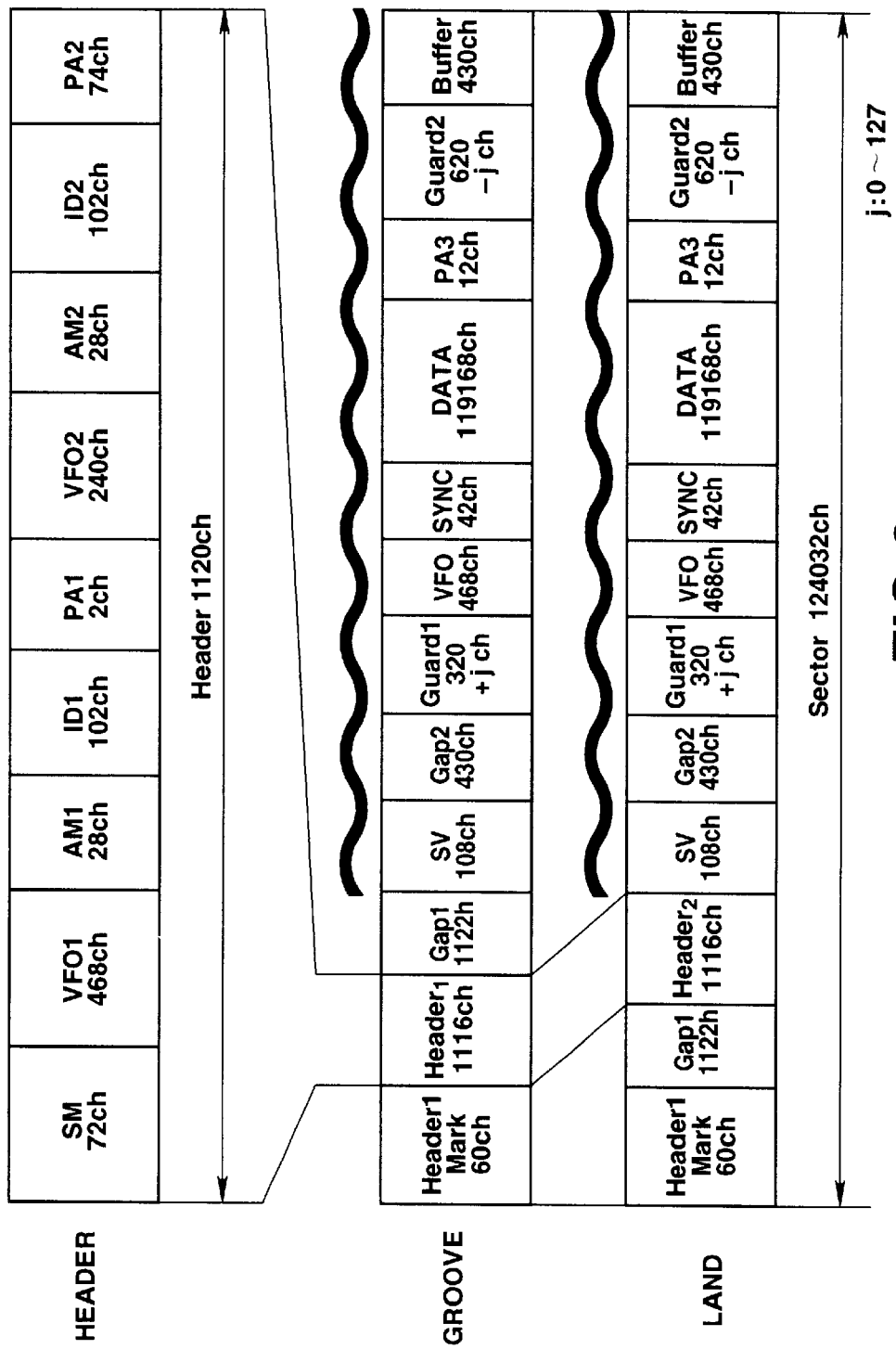
FIG. 8 shows a configuration of a sector recorded in the optical disc in FIGS. 1A, 1B, 1C, and 1D.

The write/read circuit 22 converts the data for each sector configured as shown in FIG. 8, and writes it to the optical disc 1 by means of the optical head 21. As shown, the sector consists of a header area formed from embossed pits and a write/read area of 8 kB.

The header consists of a sector mark (SM), sync timing data VFO1 and VFO2, header marks (AM1 and AM2), ID1 and ID2, and postambles (PA1 and PA2). The groove has a header 1 formed therein, and the land has a header 2 formed thereon. Gap areas (Gap 1, Gap2 and Gap3) are used to change the timing signal. Guard areas (Guard1 and Guard2) are used for starting and ending a writing. The guard area has a predetermined length and shifts the position of a written data by j-ch each time data is written. Thus, data at write starting and ending positions are not used any longer, so that deterioration of record identification at the write starting and ending positions due to an overwrite will not adversely affect on the data. The position of written data is shifted at each data writing, which improves the number of times of overwriting. At the VFOs, PLL (phase locked loop) is pulled in. SYNC indicates a starting position of a data. Buffer area is to absorb an influence of a jitter due to such as run-out or eccentricity. In one sector, a groove is formed to have 408 wobbling periods.

Figure 9:
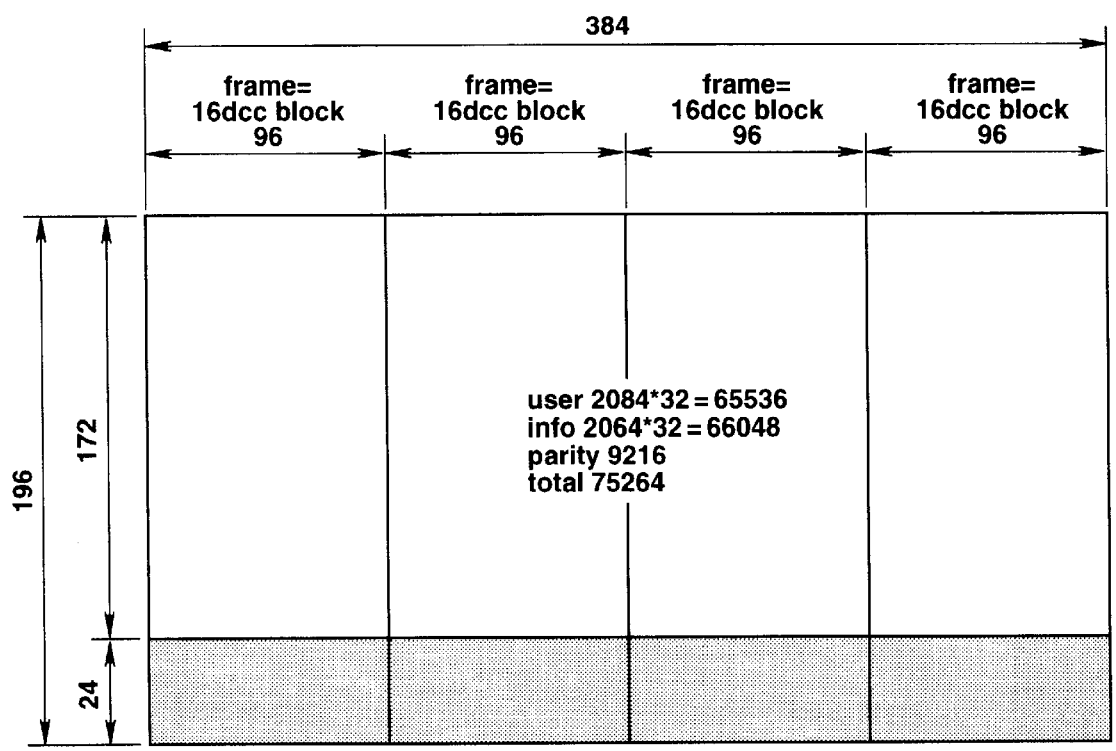
FIG. 9 shows a configuration of an ECC block recorded in the optical disc in FIGS. 1A, 1B, 1C, and 1D.

On the other hand, each error correction block (ECC block) is composed of 64 kB as shown in FIG. 9. It may be also handled as a 2-kB data sector for write and read. In this case, each error correction block is written and read with 64 kB, and a desired data of 2 kB is to be written and read to and from the error correction block. More particularly, a parity of 24 bytes is added to a data of 172 bytes. Note that the interleave length is 384 bytes.

Figure 10:
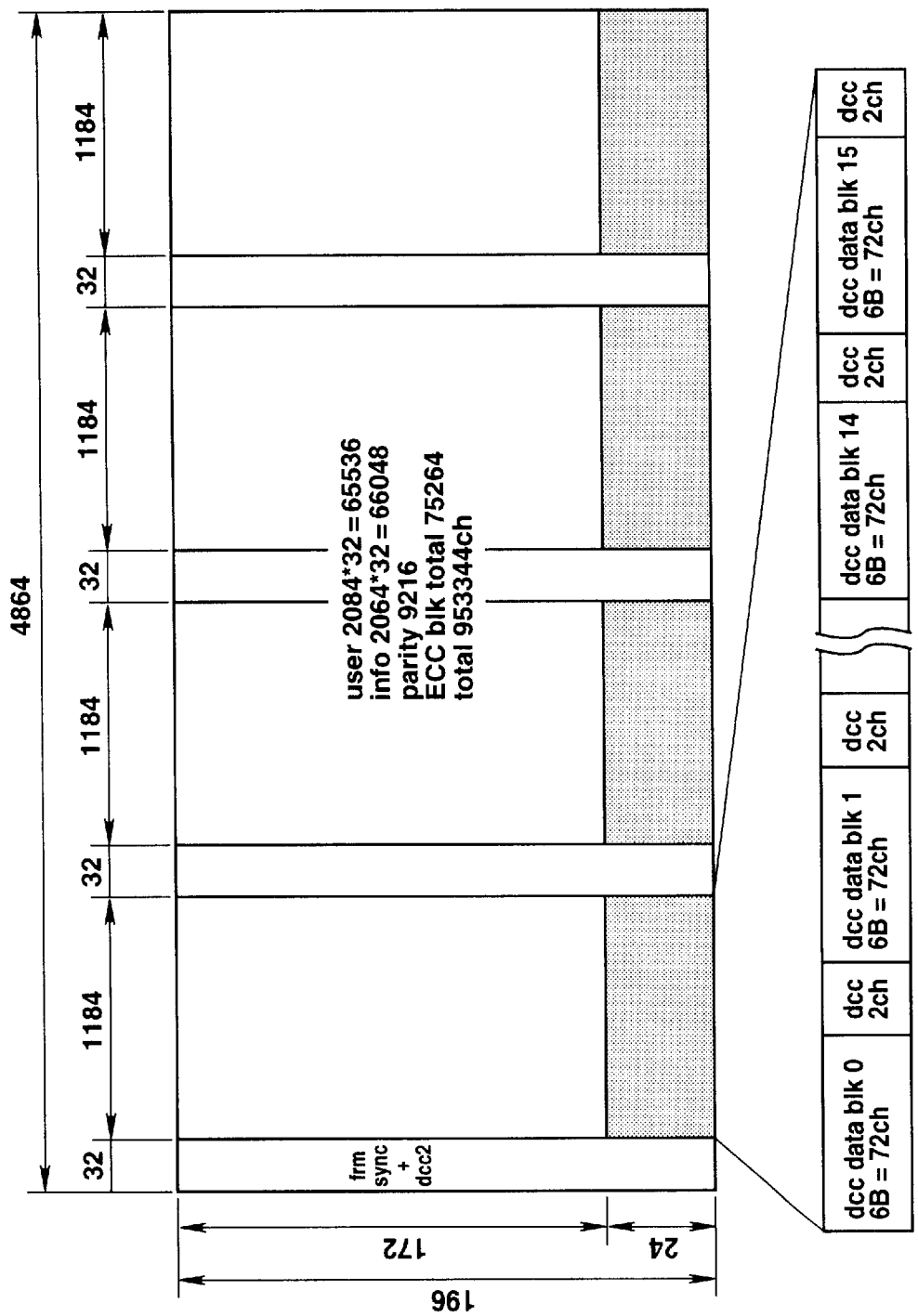
FIG. 10 shows a configuration of a frame recorded in the optical disc in FIGS. 1A, 1B, 1C, and 1D.

FIG. 10 shows the configuration of a frame. As shown, a frame sync is located along with a dcc bit at the top of each frame. Frame data is a quarter of a data in one interleave of the error correction block. Each frame consists of 16 dcc blocks. The dcc block consists of a $1/16$ of a frame data and a dcc.

The optical head 21 is disposed opposite a high NA optical disc having an NA of 0.85 and thickness of 0.1 mm, and uses a laser of 635 nm or 515 nm in wavelength. The optical head 21 supplies a detection output of a reflected light of the laser beam from the optical disc 1 to the write/read circuit 22, servo circuit 24, address detection circuit 25 and wobbling signal generation circuit 27.

The servo circuit 24 generates a focus error signal from the detection output provided from the optical head 21, and controls the focus of the optical head 21 based on the focus error signal. The servo circuit 24 generates a pushpull signal from the detection output provided from the optical head 21, and controls the tracking of the optical head 21 based on the pushpull signal.

Figure 11:
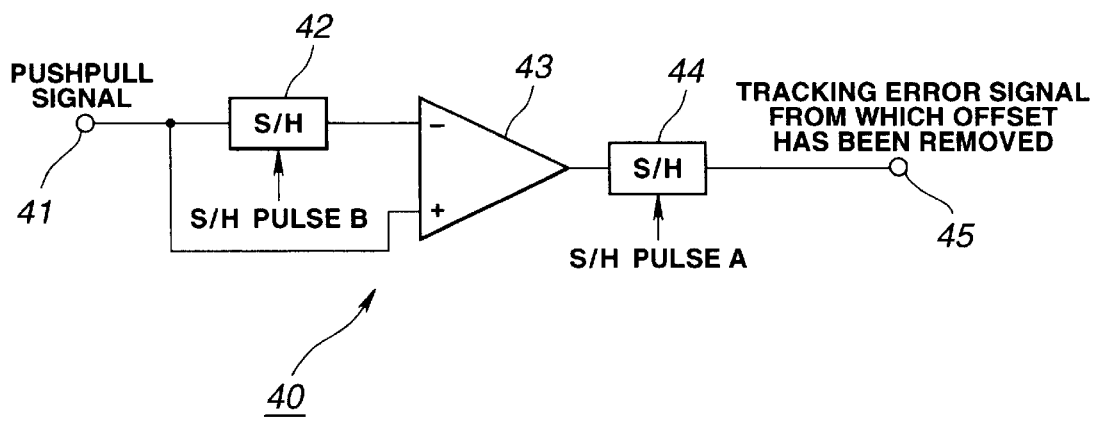
FIG. 11 is a schematic block diagram of a tracking offset elimination circuit in a servo circuit provided in the optical disc drive in FIG. 7.

The servo circuit 24 has a tracking error offset elimination circuit 40 constructed as shown in FIG. 11, and supplies the pushpull signal to this tracking error offset elimination circuit 40 in which an offset is eliminated from the pushpull signal to provide a tracking error signal under which the tracking of the optical head 21 is controlled.

More particularly, the tracking error offset elimination circuit 40 comprises a sample and hold circuit 42 to sample and hold a pushpull signal supplied as a tracking error signal at an input terminal 41 thereof, a differential amplifier 43 to detect a difference between a pushpull signal from the input terminal 41 and a one from the sample and hold circuit 42, and a sample and hold circuit 44 to sample and hold a pushpull signal from the differential amplifier 43. The sample and hold circuit 42 samples and holds the pushpull signal synchronously with a sample and hold pulse (will be referred to as "S/H pulse" hereinunder) B with the sampling and holding time constants being kept unchanged until the laser beam moves over one sector. The sample and hold circuit 44 samples and holds the pushpull signal synchronously with an S/H pulse A with the sampling and holding time constants being kept unchanged until the laser beam moves over the address area AR1.

Figure 12:
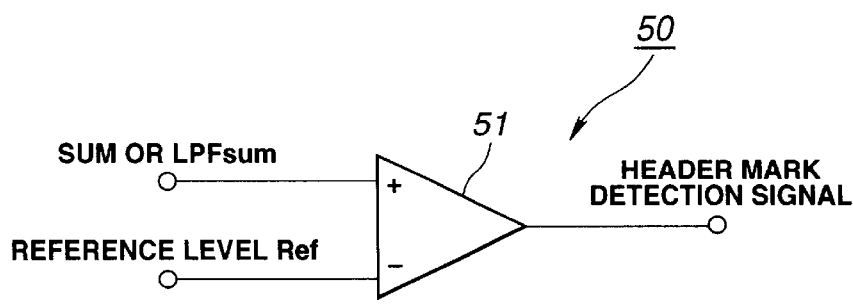
FIG. 12 is a schematic block diagram of a header mark area detector in an address circuit provided in the optical disc drive in FIG. 7.
Figure 13:
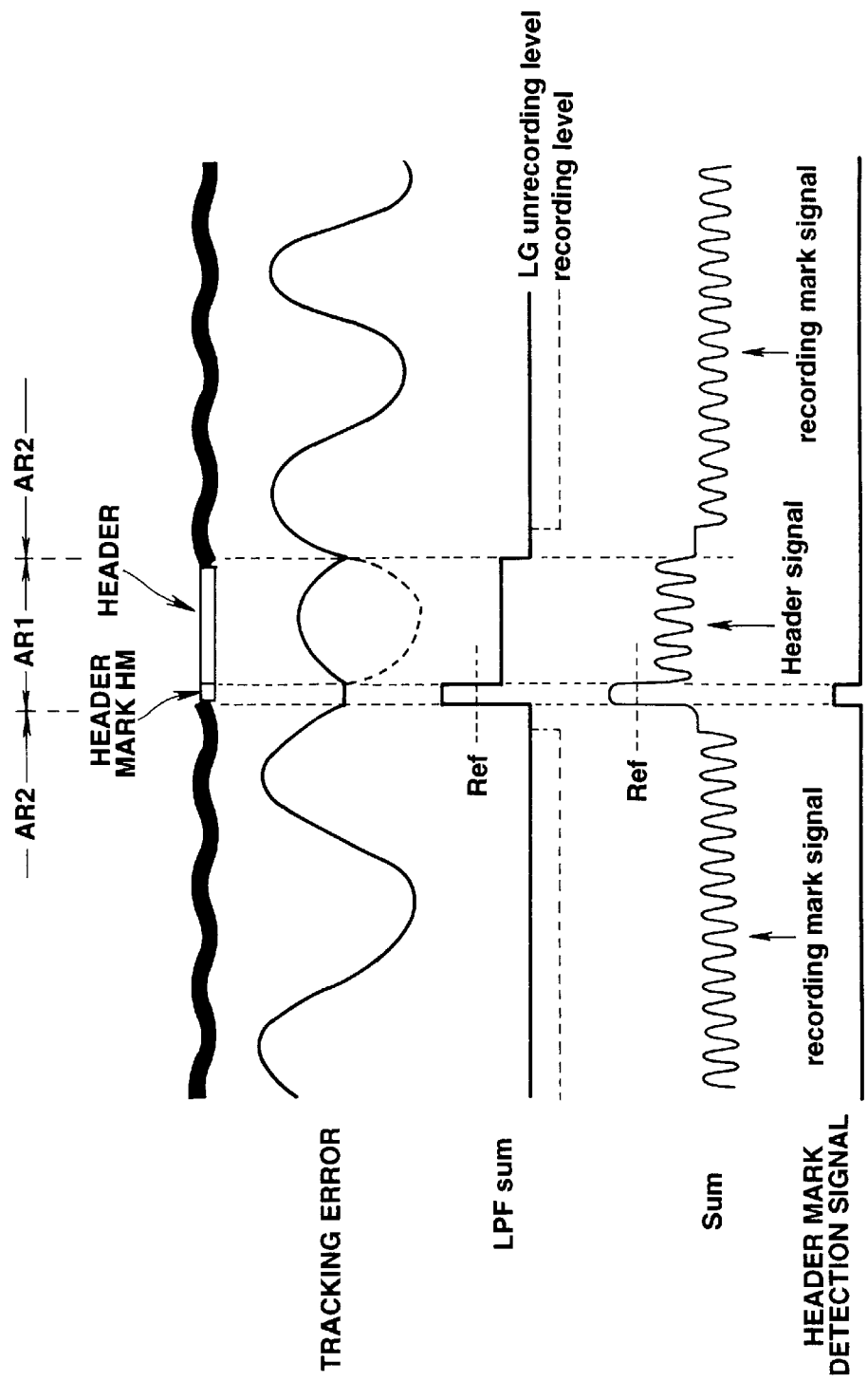
FIG. 13 explains the operation of the header mark area detector in FIG. 12.

The S/H pulses A and B are produced by a timing generator (not shown) based on a detection output provided from a header mark detector 50. The header mark detector 50 comprises a level comparator 51, as shown in FIG. 12, to detect a header mark area HM formed from a mirror finished surface of a leading portion of each address area. The header mark HM formed from the mirror finished surface as mentioned above has a higher reflectivity than each address pit area of the land header LH and groove header GRH of the user areas AR2 and address area AR1 of the land track and groove track. Thus the header mark area detector 50 compares, in the level comparator 51, a signal level of a sum signal SUM obtained as a detection output provided from the optical head 21 or its lowpass filter output LPFsum signal, with a reference level Ref as shown in FIG. 13 to detect the header marker HM simply and positively. The header mark area detector 50 is provided in the address detection circuit 25, for example.

The sample and hold circuit 42 samples and holds a pushpull signal synchronously with the S/H pulse B to detect a direct-current (DC) offset of the pushpull signal and holds it for a period of one sector. When the laser beam is incident upon the user area AR2 through the address area AR1, the differential amplifier 43 eliminates or removes the DC offset from the pushpull signal from the user area AR2 and provides an offset-free pushpull signal.

Figure 14:
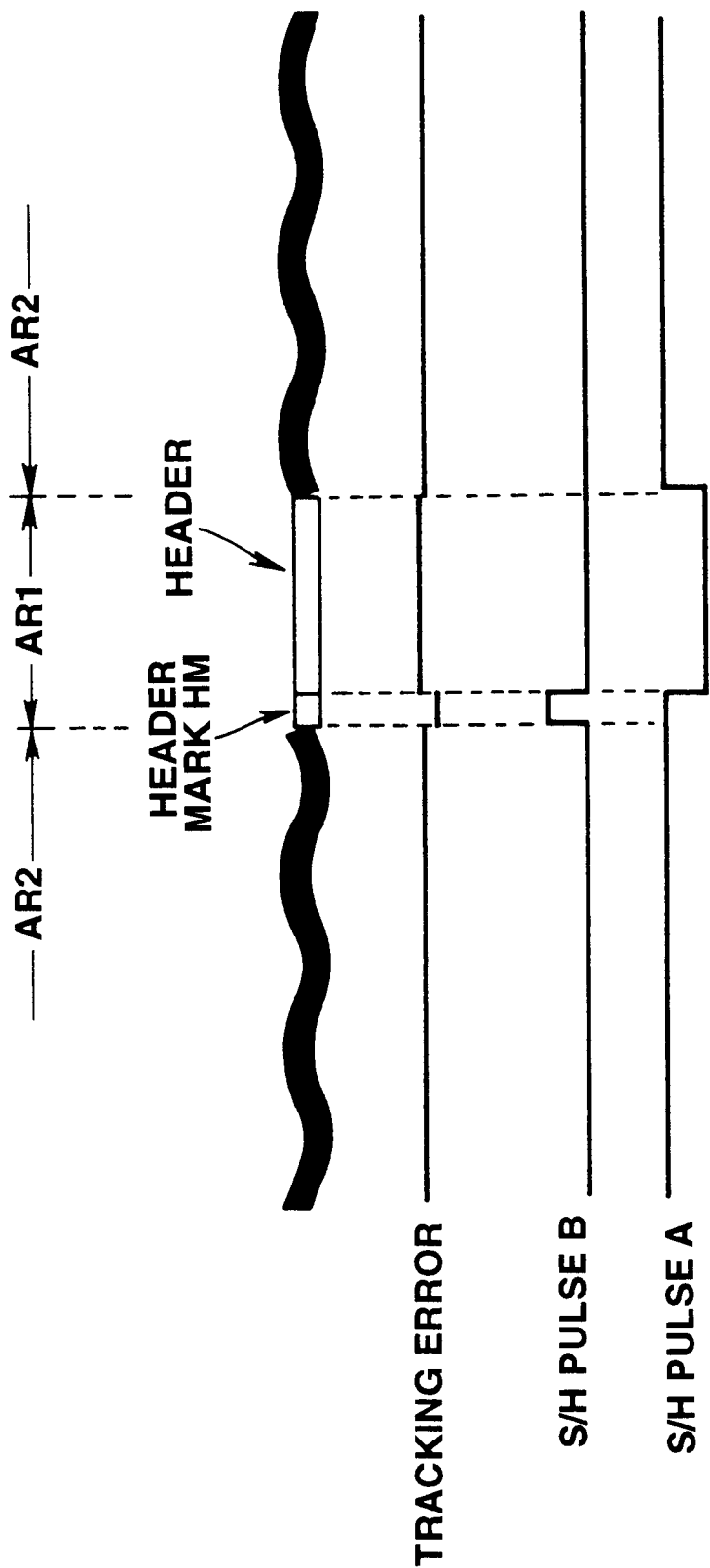
FIG. 14 explains the operation of the tracking offset elimination circuit in FIG. 11.

As shown in FIG. 14, the tracking error offset elimination circuit 40 detects a header mark HM in the address area AR1 of each sector, samples and holds an offset of a pushpull signal, that is, a tracking error signal based on the detection output, and eliminates the offset from the pushpull signal in the user area AR2, thereby providing an appropriate pushpull signal. Thus, even if a run-out or eccentricity takes place in the spinning of the optical disc 1 and a DC offset is arisen in the pushpull signal, the optical head tracking can be controlled accurately.

Since the tracking error offset elimination circuit 40 cannot provide a normal pushpull signal, the sample and hold circuit 44 samples and holds a pushpull signal in a user area AR2 just before the address area AR1, thereby providing a pushpull signal.

Note that the sample and hold circuit 44 may be replaced with a lowpass filter since it is destined for removing a disturbance in the address area AR1.

At the stage where the tracking servo is pulled in, no servo loop has yet been formed. So, based on the detection output provided from the header mark area detector 50, the tracking servo pull-in with the optical head standing in the address area is disabled and only a tracking servo pull-in with the optical head standing in the user area is enabled. Thus, the tracking servo pull-in can be quickly and correctly.

Even when the laser beam is focused on a wobbling land, the tracking error offset elimination circuit 40 can eliminate an offset having taking place in the pushpull signal as in the above.

Figure 15:
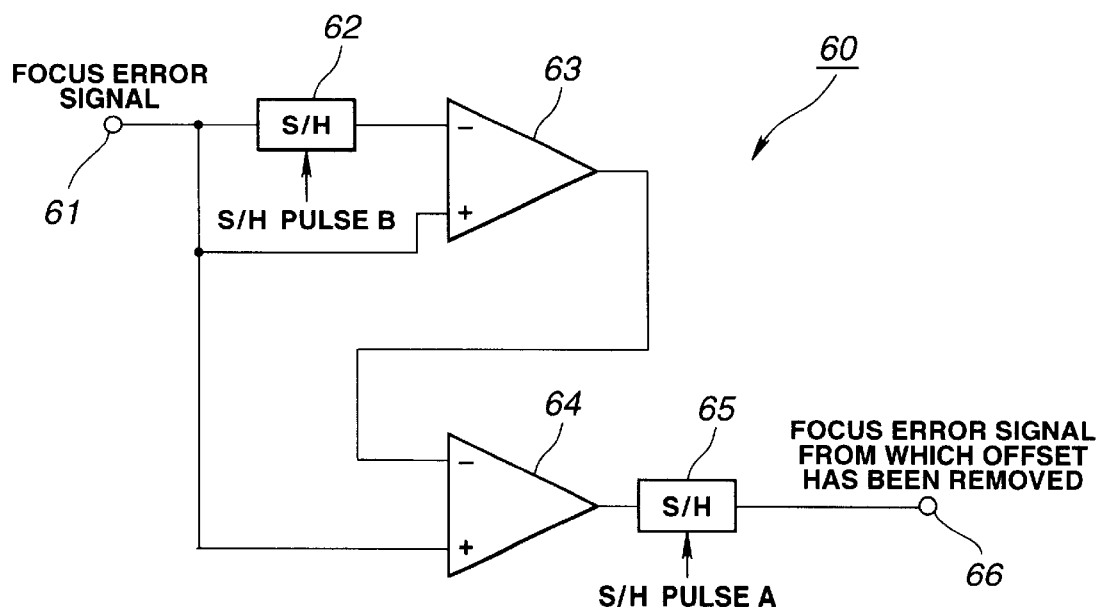
FIG. 15 is a schematic block diagram of a focus offset elimination circuit in the servo circuit provided in the optical disc drive in FIG. 7.

The servo circuit 24 has a focus error offset elimination circuit 60 constructed, as shown in FIG. 15, to eliminate an offset from a pushpull signal, thereby producing a focus error signal which is used to control the focus of the optical head 21.

More particularly, the focus error offset elimination circuit 60 comprises a sample and hold circuit 62 to sample and hold a focus error signal supplied at an input terminal 61 thereof, a first differential amplifier 63 to detect, as a focus error offset, a difference between a focus error signal from the input terminal 61 and a one from the sample and hold circuit 62, a second differential amplifier 64 to detect a difference between a focus error signal supplied at the input terminal 61 and the focus error offset detected by the first differential amplifier 63, and a sample and hold circuit 65 to sample and hold a difference detection output provided from the second differential amplifier 64.

The sample and hold circuit 62 samples and holds the focus error signal synchronously with the S/H pulse B. And the sample and hold circuit 65 samples and holds the difference detection output synchronously with the S/H pulse A.

Figure 16:
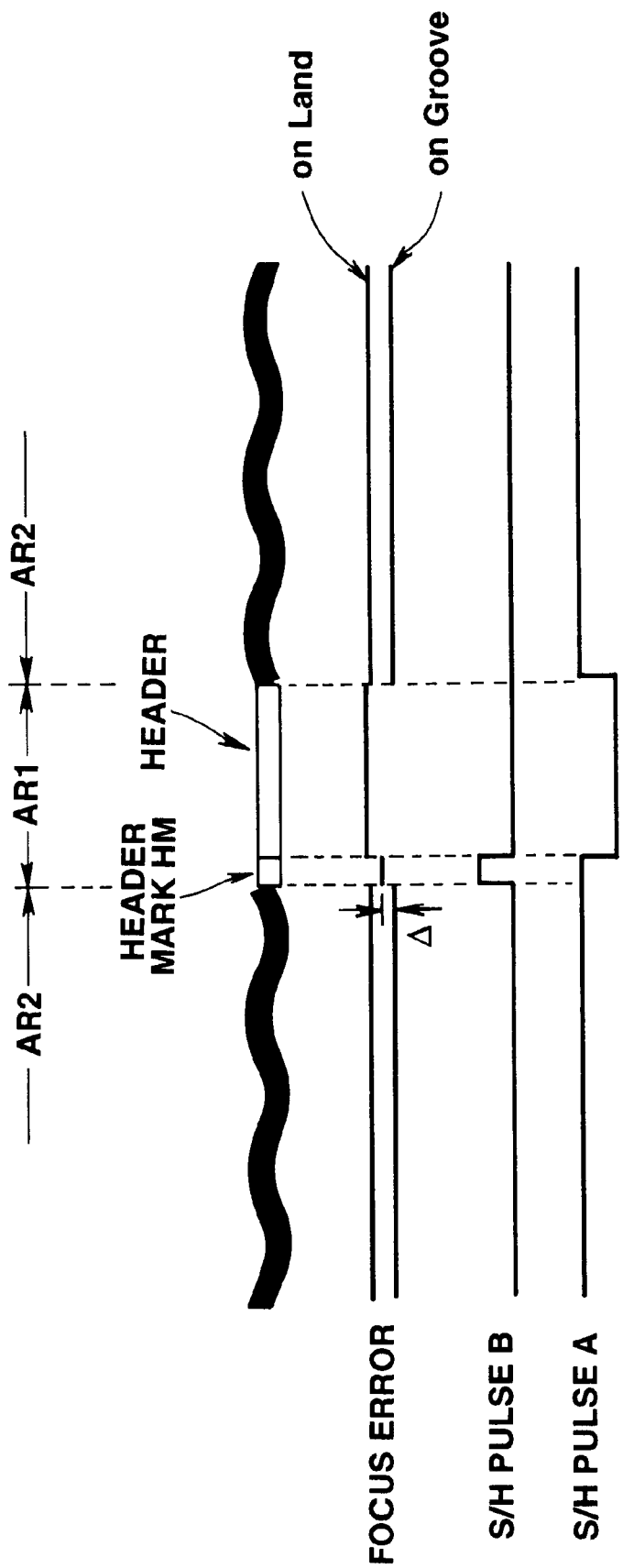
FIG. 16 explains the operation of the focus offset elimination circuit in FIG. 15.

The sample and hold circuit 62 samples and holds the focus error signal synchronously with the S/H pulse B to hold it for a period of one sector. The focus error signal, that is, a focus error signal in the header mark HM formed from the mirror finished surface provided in the leading part of the address area AR1, indicates a focus error not influenced by the land and groove, that is, a focus error free from the focus error offset. As shown in FIG. 16, the first differential amplifier 63 detects, as a focus error offset Δ, a difference between the focus error signal sampled and held by the sample and hold circuit 62 and a focus error caused with the optical head staying in the user area AR2. The second differential amplifier 64 detects a difference between a focus error signal supplied at the input terminal 61 and a focus error offset detected by the first differential amplifier 63, thereby generating a focus error signal free from the focus error offset.

In the focus error offset elimination circuit 60, a focus error signal from which the focus error offset has been removed is further sampled and held by the sample and hold circuit 65 synchronously with the S/H pulse A, to thereby eliminate a disturbance in the address area AR1.

Note that since the sample and hold circuit 65 is provided to remove the disturbance in the address area AR1, it may be replaced with a lowpass filter.

Figure 7:
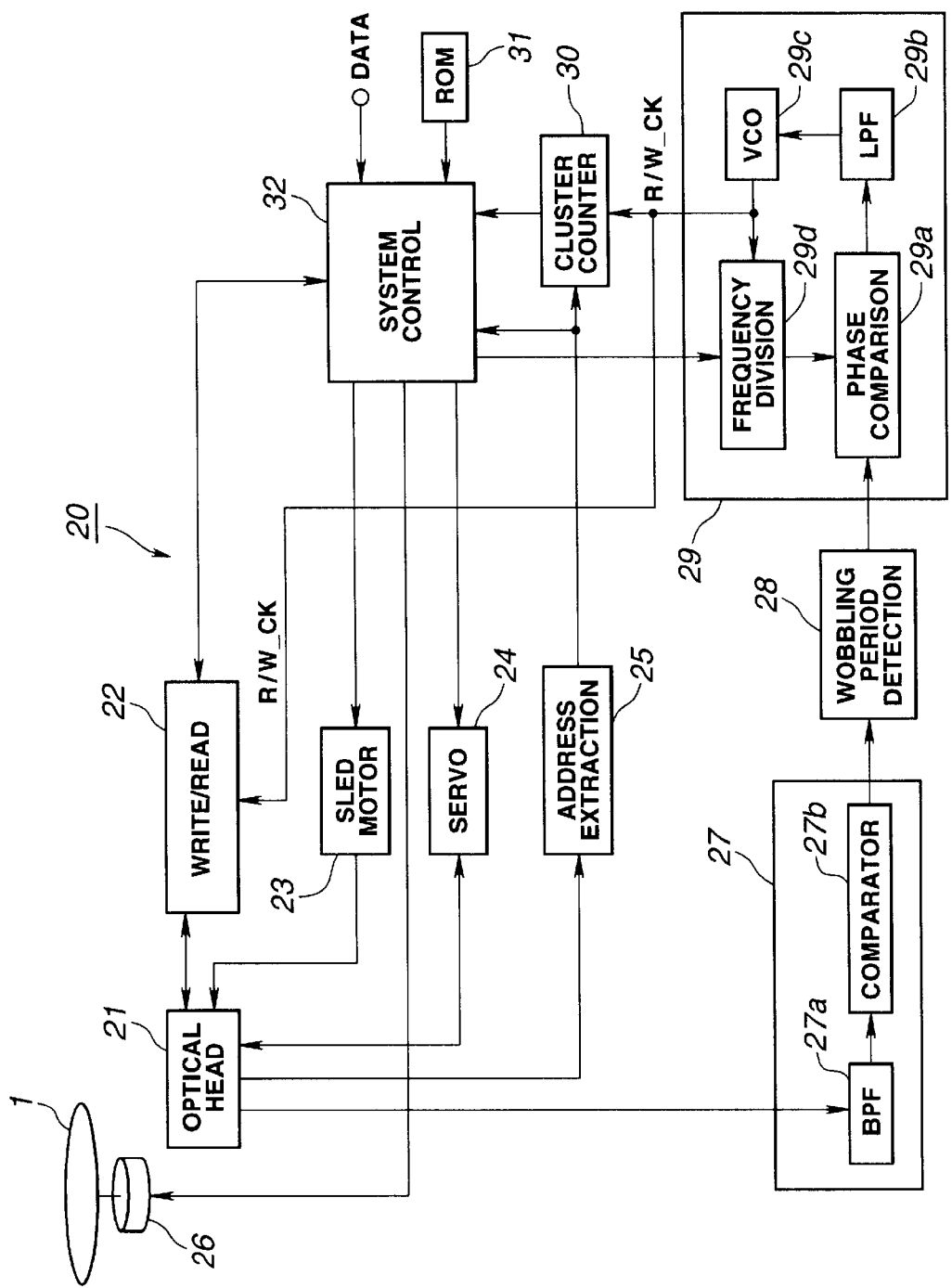
FIG. 7 is a schematic block diagram of a drive for the optical disc in FIGS. 1A, 1B, 1C, and 1D.

On the other hand, the address detection circuit 25 in the optical disc drive 20 shown in FIG. 7 decodes an address data from the detection output provided from the optical head 21 for detection of any error or other, and then supplies the decoded data to the system control circuit 32.

The optical disc drive 20 comprises a wobbling signal generation circuit 27, wobbling period detection circuit 28, PLL (phased-locked loop) circuit 29, cluster counter 30 to count the address position, ROM 31 having a predetermined control program stored therein, and a system control circuit 32 to control each circuit in the optical disc drive 20.

The wobbling signal detection circuit 27 comprises a bandpass filter (BPF) 27a to remove a noise component from the wobbling signal, and a comparator 27b for binary coding of the wobbling signal. The BPF 27a is supplied via the optical head 21 with a groove wobbling detection signal (wobbling signal) recorded in the optical disc 1, and removes a noise from the wobbling signal. The noise-free wobbling is supplied to the comparator 27b which will binary-code the wobbling signal from the BPF 27a to produce a wobbling detection pulse which will be supplied to the wobbling period detection circuit 28.

The wobbling period detection circuit 28 judges whether the wobbling detection pulse has a predetermined periodicity. If the pulse is judged to have the periodicity, it is supplied to the PLL circuit 29.

The PLL circuit 29 comprises a phase comparator 29a, lowpass filter (LPF) 29b to remove a high frequency noise component, voltage control oscillator (VCO) 29c and a frequency divider 29d.

The phase comparator 29a compares the phase of a wobbling detection pulse from the wobbling period detection circuit 28 with that of a pulse from the frequency divider 29d to supply a phase comparison error signal indicative of a phase error to the VCO 29c via the LPF 29b. The VCO 29c generates a channel clock (will be referred to as "R/W clock" hereinunder) based on the phase comparison error signal, and supplies it to the frequency divider 29d and cluster counter 30. The frequency divider 29d has the frequency division ratio controlled by the system control circuit 32, and divides the frequency of the R/W clock from the VCO 29c to generate a pulse having a same frequency as the wobbling signal for supply to the phase comparator 29a. With these operations, an R/W clock is generated based on the wobbling signal.

Based on an address from the address detection circuit 25 and an R/W clock from the VCO 29c, the cluster counter 30 counts the position of a next address by generating a sync signal synchronous with the period of the address from the address detection circuit 25. Also, when the cluster counter 30 cannot detect the position of the next address, the position of the next address is determined and the address is counted up.

The system control circuit 32 controls the revolution of the sled motor 23 based on the address detected by the cluster counter 30, and allows the optical head 21 to access to a predetermined position on the optical disc 1 and write or read data to or from the optical disc 1 at the cluster write/read timing. Also, the ROM 31 has stored therein a frequency division ratio data for the frequency divider 29d for each address. The system control circuit 32 controls the frequency division ratio for the frequency divider 29d based on the data in the ROM 31. The system control circuit 32 controls the write/read circuit 22, processes a data read by the optical head 21 in a predetermined manner, provides the processed data to outside, and converts an external input data to a predetermined format. The converted data is written to the optical disc 1 by means of the optical head 21.

In the embodiment having been described in the foregoing, the header mark area HM is formed of a mirror finished surface in the leading part of the address area AR1 as shown in FIGS. 4 and 5. However, the present invention is not limited to this optical disc configuration.

Figure 17:
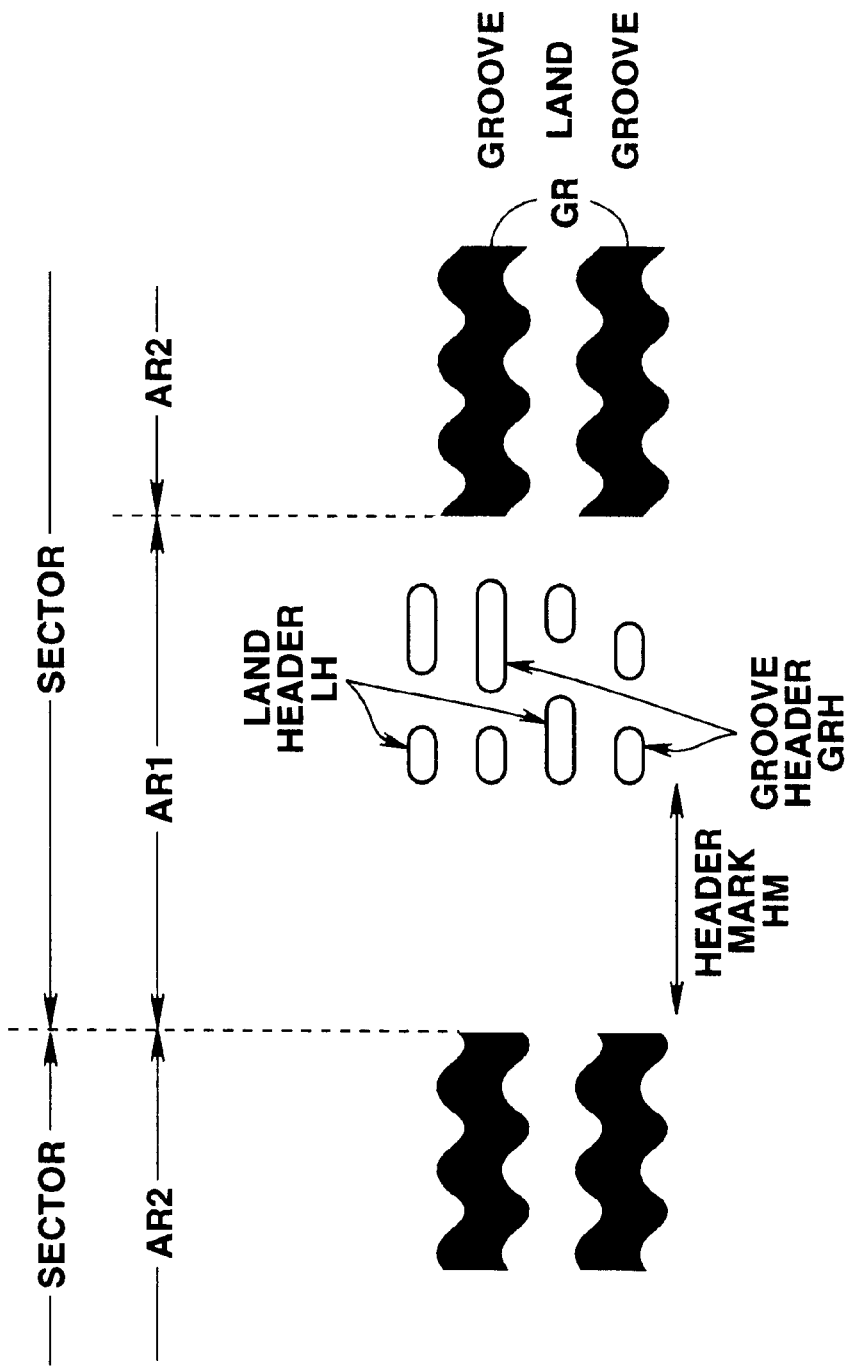
FIG. 17 shows a still another configuration of another configuration of the optical disc in FIG. 3, showing an address area and user areas.
Figure 18:
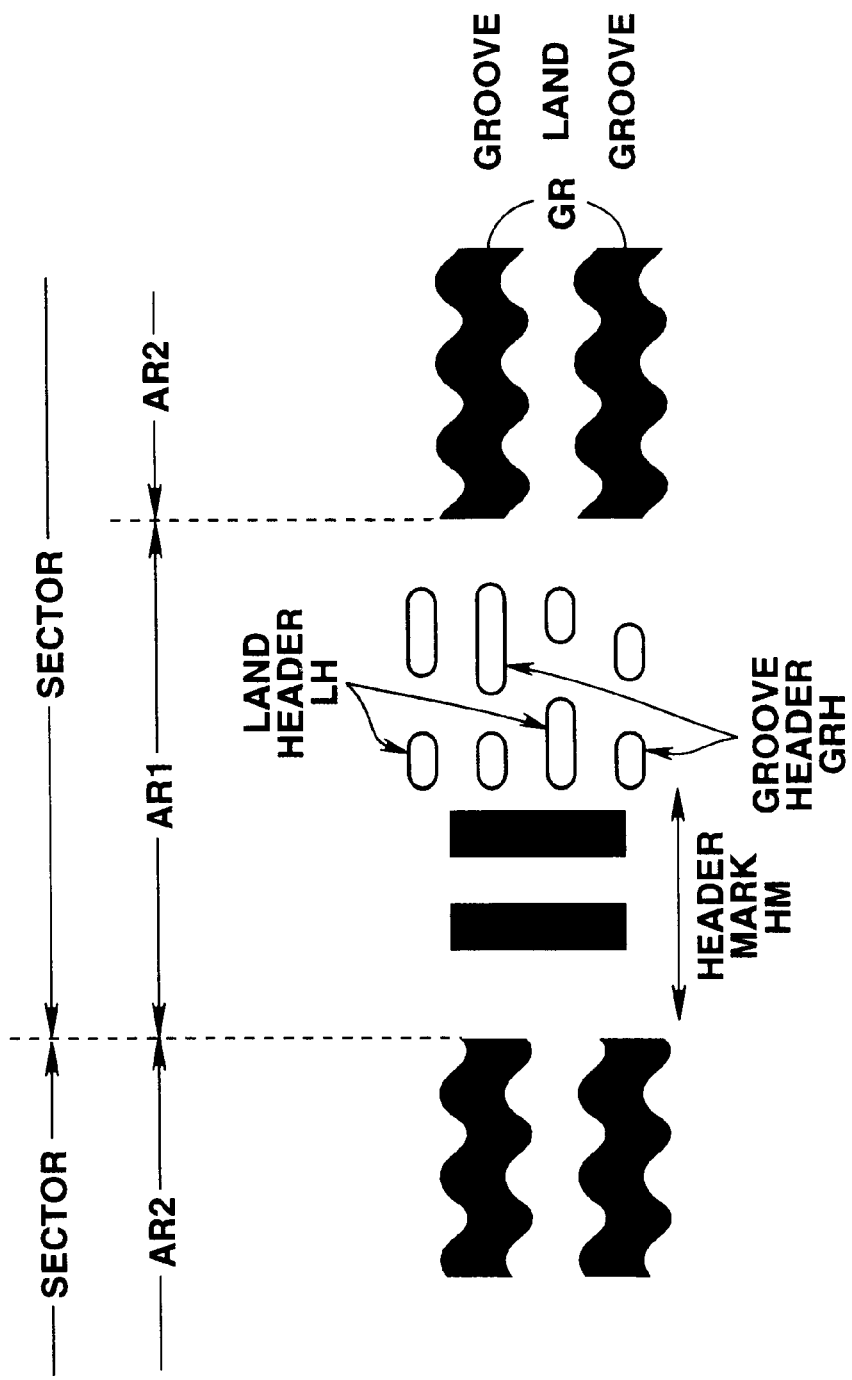
FIG. 18 a yet another configuration of another configuration of the optical disc in FIG. 3, showing am address area and user areas.

As shown in FIGS. 17 and 18, a header mark HM consisting.of a mirror finished surface M and groove G may be formed in the leading header mark area of each address area. In this case, the header mark HM in the header mark area may be formed to indicate a boundary between a groove track and land track with a unique pattern. In the optical disc drive 20, the header mark HM formed to indicate the boundary between the groove and land tracks with the unique pattern is detected to change the polarity of a tracking error signal.

As having been described in the foregoing, the optical disc according to the present invention has spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface, whereby offset arisen in tracking and focus error signals can be eliminated to accurately control the tracking and focus.

Also, the optical disc according to the present invention has spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface and grooves, whereby offset arisen in tracking and focus error signals can be eliminated to accurately control the tracking and focus.

The optical disc according to the present invention has, for instance, groove tracks and land tracks formed to wobble at a single frequency, whereby the single frequency may be given as a reference frequency to the reproducing system.

The optical disc according to the present invention is formed, for instance, to have a plurality of zones formed by dividing the data recording surface of the optical disc concentrically and a plurality of sector structures formed by dividing each zone on the data recording surface into radial areas.

The optical disc according to the present invention has the header mark in the header mark area formed to indicate a boundary between a groove track and land track with a unique pattern.

According to the present invention, the tracking controlling apparatus and method, for use with an optical disc having spiral grooves and lands formed on a data recording surface thereof and in which information is written to, and read from, both a land between the grooves and the grooves as tracks, each track having a plurality of address areas and user areas formed thereon, each of the address areas having an embossed pit for a groove header and an embossed pit for a land header, and each of the address areas having formed in a leading part thereof a header mark area consisting of a mirror finished surface, are adapted such that a tracking error signal is generated by a tracking error generating means from a detection output provided from an optical head which irradiates a laser beam to, and detects a reflected light of the irradiated laser beam from, a data recording surface of the optical disc; a header mark area of the address area is detected by a header mark area detecting means based on the detection output provided from the optical head; a tracking error signal generated by the tracking error generating means from the detection output provided from the optical head staying in the header mark area of the address area is sampled and held by the sampling and holding means to detect a tracking error offset as a sampled and held output provided from the sampling and holding means; and a difference between the tracking error signal generated by the tracking error generating means and the tracking error signal sampled and held by the sampling and holding means is detected by a difference detecting means to provide a tracking error signal from which the tracking error offset has been removed. Therefore, the difference detection output provided from the difference detecting means can be used to accurately control the tracking of the optical head.

The tracking controlling apparatus and method according to the present invention is adapted, for example, such that the tracking controlling means disables a tracking servo pull-in with the optical head standing in the address area and enables only a tracking servo pull-in with the optical head standing in the user area, based on the detection output provided from the header mark area detecting means. Thus the tracking servo can positively be pulled in.

The tracking controlling apparatus and method according to the present invention is adapted, for instance, such that based on the detection output provided from the header mark area detecting means, the tracking controlling means controls the tracking of the optical head using as a tracking error signal a sampled and held output provided from the sampling and holding means which holds the difference detection output provided from the difference detecting means for a period during which the optical head stays in the address area, to eliminate a disturbance in the address area from the tracking error signal. Thus the tracking of the optical head can accurately be controlled by the tracking controlling means.

The tracking controlling apparatus and method according to the present invention is adapted, for example, such that the tracking controlling means controls the tracking of the optical head using as a tracking error signal an output provided from a lowpass filter means which is supplied with the difference detection output provided from the difference detecting means, to remove a disturbance in the address area from the tracking error signal. Thus the tracking of the optical head can accurately be controlled by the tracking controlling means.

In the focus controlling apparatus and method according to the present invention, for use with an optical disc having spiral grooves and lands formed on a data recording surface thereof and in which information is written to, and read from, both a land between the grooves and the grooves as tracks, each track having a plurality of address areas and user areas formed thereon, each of the address areas having an embossed pit for a groove header and an embossed pit for a land header, and each of the address areas having formed in a leading part thereof a header mark area consisting of a mirror finished surface and grooves; a focus error signal is generated from a detection output provided from an optical head which irradiates a laser beam to, and detects a reflected light of the irradiated laser beam from, a data recording surface of the optical disc; a header mark area of the address area is detected by the header mark area detecting means based on the detection output provided from the optical head; a focus error signal generated by the focus error generating means from the detection output provided from the optical head staying in the header mark area of the address area is sampled and held by a sampling and holding means based on the detection output provided from the header mark area detecting means; a difference between the focus error signal generated by the focus error generating means and the focus error signal sampled and held by the sampling and holding means is detected by a first difference detecting means; a difference between the focus error signal generated by the focus error signal generating means and the difference detection output provided from the first difference detecting means is detected by a second difference detecting means. Thus a focus error signal can be obtained from which a focus error offset has been eliminated. The difference detection output provided from the second difference detecting means can be used as a focus error signal to accurately control the focus of the optical head.

The focus controlling apparatus and method according to the present invention is adapted, for instance, such that based on the detection output provided from the header mark area detecting means, a sampled and held output provided from the sampling and holding means which holds the difference detection output provided from the second difference detecting means for a period during which the optical head stays in the address area, is used as a focus error signal to eliminate a disturbance in the address area from the focus error signal. Thus the focus of the optical head can accurately be controlled by the focus controlling means.

The focus controlling apparatus and method according to the present invention is adapted, for example, such that an output provided from a lowpass filter means which is supplied with the difference detection output provided from the second difference detecting means, is used as a focus error signal to remove a disturbance in the address area from the focus error signal. Thus the focus of the optical head can accurately be controlled by the focus controlling means.

What is claimed is:

1. An optical disc having spiral grooves formed on a data recording surface thereof and in which information is written to, and read from, both a land between the grooves and the grooves as tracks, each track having formed thereon a plurality of address areas and user areas;

each of the address areas having formed thereon embossed pits for a groove header and embossed pits for a land header; and each of the address areas having provided in a leading part thereof a header mark area formed from a mirror finished surface.

2. The optical disc as set forth in claim 1, wherein groove tracks and land tracks are formed wobble at a single frequency.

3. The optical disc as set forth in claim 1, wherein a plurality of zones is formed by dividing the data recording surface concentrically and a plurality of sectors is formed by dividing each zone on the data recording surface into radial areas.

4. A tracking controlling apparatus, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface, the apparatus comprising:

means for generating a tracking error signal from a detection output provided from an optical head which irradiates a laser beam to, and detects a reflected light of the irradiated laser beam from, a data recording surface of the optical disc;

means for detecting a header mark area of the address area based on the detection output provided from the optical head;

means for sampling and holding, based on the detection output provided from the header mark area detecting means, a tracking error signal generated by the tracking error generating means from the detection output provided from the optical head staying in the header mark area of the address area;

means for detecting a difference between the tracking error signal generated by the tracking error generating means and the tracking error signal sampled and held by the sampling and holding means; and means for controlling the tracking of the optical head using as a tracking error signal the difference detection output provided from the tracking error difference detecting means.

5. The apparatus as set forth in claim 4, further comprising means for disabling a tracking servo pull-in with the optical head standing in the address area and enabling only a tracking servo pull-in operation with the optical head standing in the user area, based on the detection output provided from the header mark area detecting means.

6. The apparatus as set forth in claim 4, farther comprising means for sampling and holding, based on the detection output provided from the header mark area detecting means, the difference detection output provided from the header mark area detecting means for a period during which the optical head stays in the address area;

the tracking controlling means controlling the tracking of the optical head using the sampled and held output provided from the sampling and holding means as a tracking error signal.

7. The apparatus as set forth in claim 4, further comprising a lowpass filter means which is supplied with the difference detection output provided from the difference detecting means;

the tracking controlling means controlling the tracking of the optical head using an output provided from the lowpass filter means as a tracking error signal.

8. A tracking controlling method, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface, the method comprising the steps of:

generating a tracking error signal from a detection output provided from an optical head which irradiates a laser beam to, and detects a reflected light of the irradiated laser beam from, a data recording surface of the optical disc;

detecting a header mark area of the address area based on the detection output provided from the optical head;

sampling and holding, based on the detection output provided from the header marker area detecting means, a tracking error signal generated from the reflected light detection output provided from the optical head staying in the header mark area of the address area;

detecting a difference between the tracking error signal generated from the reflected light detection output and the sampled and held tracking error signal sampled; and controlling the tracking of the optical head using the difference detection output as a tracking error signal.

9. The method as set forth in claim 8, further comprising the step of:

disabling the tracking servo pull-in with the optical head standing in the address area, and enabling only the tracking servo pull-in operation with the optical head standing in the user area, based on the header mark area detection output.

10. The method as set forth in claim 8, further comprising the step of:

controlling, based on the header mark area detection output, the tracking of the optical head with a tracking error signal of which the difference detection output has been held for a period during which the optical head stays in the address area.

11. An optical disc having spiral grooves formed on a data recording surface thereof and in which information is written to, and read from, both a land between the grooves and the grooves as tracks, each track having formed thereon a plurality of address areas and user areas;

each of the address areas having formed thereon embossed pits for a groove header and embossed pits for a land header; and each of the address areas having provided in a leading part thereof a header mark area formed from a mirror finished surface and grooves.

12. The optical disc as set forth in claim 11, having a header mark area in which the boundary between the groove tracks and land track is indicated with a unique pattern.

13. The optical disc as set forth in claim 11, wherein groove tracks and land tracks are formed to wobble at a single frequency.

14. The optical disc as set forth in claim 11, wherein a plurality of zones is formed by dividing the data recording surface concentrically and a plurality of sectors is formed by dividing each zone on the data recording surface into radial areas.

15. A tracking controlling apparatus, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface and grooves, the apparatus comprising:

means for generating a tracking error signal from a detection output provided from an optical head which irradiates a laser beam to, and detects a reflected light of the irradiated laser beam from, a data recording surface of the optical disc;

means for detecting a header mark area of the address area based on the detection output provided from the optical head;

means for sampling and holding, based on the detection output provided from the header mark area detecting means, a tracking error signal generated by the tracking error generating means from the detection output provided from the optical head staying in the header mark area of the address area;

means for detecting a difference between the tracking error signal generated by the tracking error generating means and the tracking error signal sampled and held by the sampling and holding means; and means for controlling the tracking of the optical head using as a tracking error signal the difference detection output provided from the tracking error difference detecting means.

16. The apparatus as set forth in claim 15, further comprising means for disabling a tracking servo pull-in with the optical head standing in the address area and enabling only a tracking servo pull-in with the optical head standing in the user area, based on the detection output provided from the header mark area detecting means.

17. The apparatus as set forth in claim 15, further comprising means for sampling and holding, based on the detection output provided from the header mark area detecting means, the difference detection output provided from the header mark area detecting means for a period during which the optical head stays in the address area;

the tracking controlling means controlling the tracking of the optical head using the sampled and held output provided from the sampling and holding means as a tracking error signal.

18. The apparatus as set forth in claim 15, further comprising a lowpass filter means which is supplied with the difference detection output provided from the difference detecting means;

the tracking controlling means controlling the tracking of the optical head using an output provided from the lowpass filter means as a tracking error signal.

19. A tracking controlling method, for use with an optical disc having spiral grooves formed on a data recording surface thereof and in which information is written to, and read from, both a land between the grooves and the grooves as tracks, each track having formed thereon a plurality of address areas and user areas, each of the address areas having formed thereon embossed pits for a groove header and embossed pits for a land header, and each of the address areas having provided in a leading part thereof a header mark area formed from a mirror finished surface and grooves, the method comprising the steps of:

generating a tracking error signal from a detection output provided from an optical head which irradiates a laser beam to, and detects a reflected light of the irradiated laser beam from, a data recording surface of the optical disc;

detecting a header mark area of the address area based on the reflected light detection output;

sampling and holding, based on the header mark area detection output, a tracking error signal generated from the reflected light detection output provided from the optical head staying in the header mark area of the address area;

detecting a difference between the tracking error signal generated from the reflected light detection output and the sampled and held tracking error signal; and controlling the tracking of the optical head using the difference detection output as a tracking error signal.

20. The method as,set forth in claim 19, further comprising the step of:

disabling the tracking servo pull-in with the optical head standing in the address area, and enabling only the tracking servo pull-in with the optical head standing in the user area, based on the header mark area detection output.

21. The method as set forth in claim 19, further comprising the step of:

controlling, based on the header mark area detection output, the tracking of the optical head with a tracking error signal of which the difference detection output has been held for a period during which the optical head stays in the address area.

* * * * *